Jan. 1, 1924

A. M. PRENCEL ET AL

MERRY-GO-ROUND

Filed Feb. 1, 1923

Inventors
A. M. Prencel and
E. Hoffman,

By

Attorney

Jan. 1, 1924. 1,479,737
A. M. PRENCEL ET AL
MERRY-GO-ROUND
Filed Feb. 1, 1923 2 Sheets-Sheet 2

Inventors
A. M. Prencel and
E. Hoffman,
By
Attorney

Patented Jan. 1, 1924.

1,479,737

UNITED STATES PATENT OFFICE.

ANTHONY M. PRENCEL AND EDWIN HOFFMANN, OF SEGUIN, TEXAS.

MERRY-GO-ROUND.

Application filed February 1, 1923. Serial No. 616,338.

*To all whom it may concern:*

Be it known that ANTHONY M. PRENCEL and EDWIN HOFFMANN, citizens of the United States of America, residing at Seguin, in the county of Guadalupe and State of Texas, have invented new and useful Improvements in Merry-Go-Rounds, of which the following is a specification.

The object of the invention is to provide a simple and efficient construction of manually operable merry-go-round or carrousel capable of being transported with facility and set up with the minimum of expenditure of time and effort at the point selected for its use; and with this object in view the invention consists in a construction and combination of parts of which a preferred embodiment is shown in the accompanying drawings, wherein:—

Figure 1:
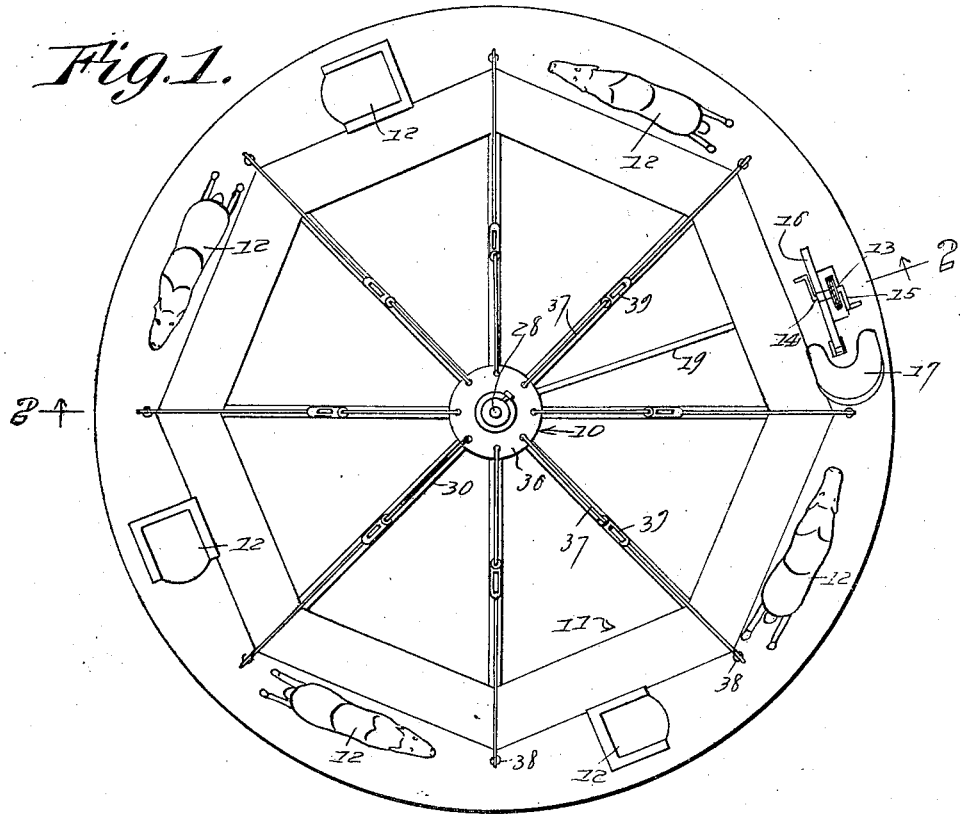
Figure 1 is a plan view of an apparatus embodying the invention.
Figure 2:
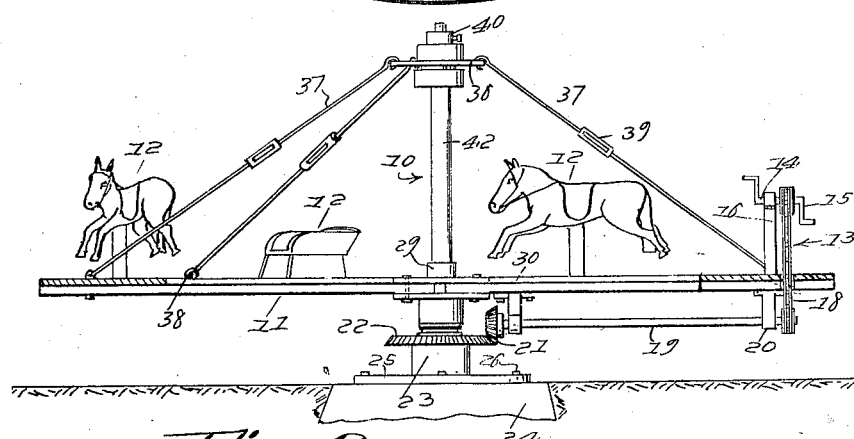
Figure 2 is a side view partly in section of the same on the plane indicated by the line 2—2 of Figure 1.
Figure 3:
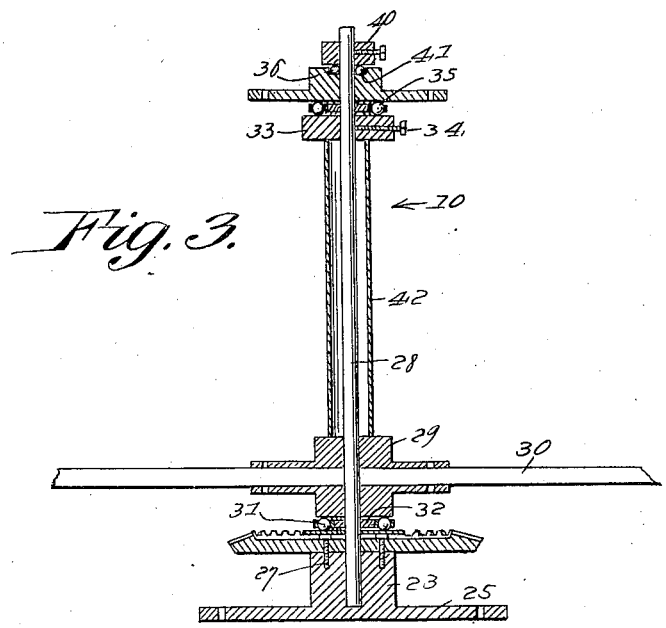
Figure 3 is a vertical sectional view of the mast and bearing elements associated therewith.
Figure 4:
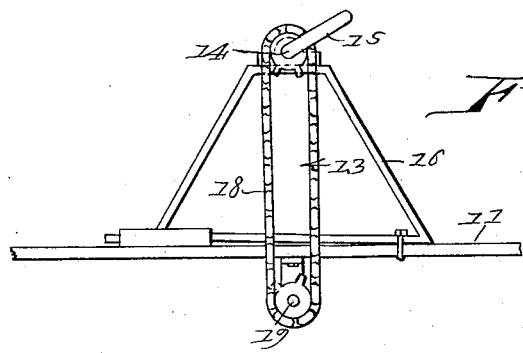
Figure 4 is a detail elevation of the operating means.

The device consists essentially of a central mast 10 upon which is revolubly mounted a platform 11 provided with seats or carriers 12 which may be in any suitable or preferred ornamental forms such as those of animals, and at a suitable point adjacent to the periphery of the platform there is arranged an operating mechanism 13 consisting of a drive shaft 14 having crank arms 15 and mounted in a suitable bearing on a standard 16 arranged adjacent to and within convenient reach of a driver's seat 17, said shaft being connected by sprocket gearing including a chain 18 or its equivalent with a driven shaft 19 mounted in bearings 20 beneath the platform and carrying a pinion 21 meshing with a stationary master gear 22 supported by a pedestal 23 which is supported by a substantial base 24 of concrete or masonry. The pedestal is provided with a base flange 25 which is anchored as by bolts 26 to the base, and the master gear is likewise bolted as at 27 to the pedestal while rising from the latter in axial relation with the master gear is a spindle 28 upon which is fitted the hub 29 of the platform frame 30 consisting of radially disposed timbers or arms of a strength sufficient to carry the load imposed upon the platform.

The hub is mounted upon the master gear by means of an anti-friction bearing 31 consisting of balls or rotary elements arranged in a suitable cage 32 and carried by the spindle at an elevation above the plane of the platform is a collar 33 secured to the spindle by means of a set-screw 34 or its equivalent and serving as the support for an anti-friction bearing 35 which sustains an anchor disk 36 with which are connected guy rods 37 extended radially and diagonally outward to attaching eyes 38 on the platform. These guy rods serve as braces to assist in maintaining the horizontality of the platform and are preferably provided with tensioning or adjusting means such as the turn buckles 39.

Above the anchor disk 36 there is arranged a retaining collar 40 with an anti-friction bearing 41 interposed between the same and said disk.

The described construction, as will be obvious, is such as will readily permit of disassembly for transportation purposes and re-assembly at the location selected for its operation and under conditions minimizing effort and the expenditure of time on the part of the operator, and as indicated any tendency of the platform to vibrate vertically on the spindle may be neutralized by the use between the hub 29 and the collar 33 of a spacing sleeve 42 bearing terminally against said elements and embracing and therefore housing and concealing the intermediate portion of the spindle. This sleeve furthermore serves as a suitable gauge in determining the spacing of the collar 33 from the hub in the assembly of the parts of the mechanism and permits of placing the guy rods under a tension sufficient to support a considerable percentage of the weight imposed upon the platform when occupied by riders without raising the hub from its operative position in relation to the foot or supporting bearing 31.

Having described the invention, what is claimed as new and useful is:—

A merry-go-round having a central pedestal from which rises a spindle, a revoluble platform having a hub mounted upon said spindle, an anchor disk revolubly mounted upon the spindle at an elevation above the plane of the platform, tensionable guy rods extending from the anchor disk to the platform near its periphery, and operating means for communicating rotary motion to the platform, an anti-frictional foot bearing being arranged beneath said hub, collars being fixed to said spindle above and below the plane of said anchor disk, anti-frictional bearings being interposed between said disk and said collars, and a spacing sleeve being disposed in embracing relation with the spindle and terminal contact respectively with the hub and the collar which is beneath said anchor disk.

In testimony whereof they affix their signatures.

ANTHONY M. PRENCEL.
EDWIN HOFFMANN.